United States Patent

[11] 3,611,016

[72] Inventors Stanley Rogers
La Jolla;
Eric R. Woods, San Diego, both of Calif.

[21] Appl. No. 23,674
[22] Filed Mar. 30, 1970
[45] Patented Oct. 5, 1971
[73] Assignee General Dynamics Corporation

[54] MATRIX SWITCH WITH IMPROVED TRANSMISSION CHARACTERISTICS
4 Claims, 3 Drawing Figs.

[52] U.S. Cl. .......... 333/7, 333/8
[51] Int. Cl. .......... H01p 1/10
[50] Field of Search .......... 333/7–9; 317/101 R, 112; 340/166

[56] References Cited

UNITED STATES PATENTS 2,914,737 11/1959 Tongue .......... 333/8
3,091,743 5/1963 Wilkinson .......... 333/9
3,223,947 12/1965 Clar .......... 333/7

OTHER REFERENCES

Beever et al. TV Multiset Antenna Couplers, Electronic Technician Dec. 1957, Pg. 32, 33 relied on 333–8

*Primary Examiner*—Herrman Karl Saalbach
*Attorneys*—Neil F. Martin and Carl R. Brown

ABSTRACT: A matrix switch circuit for switching a plurality of output buses to an input bus having the impedance of the input bus substantially lower than the impedance of any one of the output buses, having the output impedance of the line circuit matched to the input bus and with the input bus terminated in its characteristic impedance, thereby reducing the voltage-standing-wave ratio, and having means in the input line for reducing the effect of capacitance loading on the input bus resulting from opening or closing of switches electrically connecting the first bus to each of the second buses.

PATENTED OCT 5 1971

3,611,016

INVENTORS
STANLEY ROGERS
ERIC R. WOODS
BY [signature]
ATTORNEY

MATRIX SWITCH WITH IMPROVED TRANSMISSION CHARACTERISTICS

BACKGROUND OF THE INVENTION

It is evident that communication systems of the future will become larger, will often be controlled by computers, and will handle higher frequencies and larger bandwidths than heretofore. Digital communications for voice, television, and data transmissions required large bandwidths and offer substantial advantages in overcoming noise and reducing errors. Thus there will be a growing need for automatic control matrix switching systems to handle these types of signals.

Matrix switches are typically rectangular arrays of "crosspoints" that establish connections between a set of input lines and a set of output lines. A common form is the crossbar switch, which is widely used in telephony. When one crosspoint in such a crossbar switch is closed, it connects a group of one to six input lines to a group of one to six output lines. For example, these lines may be an east, west voice circuit (two wire), west-east voice circuit (two more wires), and two control and signalling circuits. A number of crosspoints may be in the closed state at the same time, each connecting a group of output lines to a group of input lines. Ideally, each circuit is independent of all others, but unfortunately the ideal is not achieved. Conventional crossbar switches are ill-suited to high frequencies, but with special measures they have been used with frequencies of several MHz. Reed switches and solid-state devices have many advantages at these and higher frequencies.

In general, all matrix switches are limited in the frequencies that they can handle. When the length of a signal conductor becomes a significant fraction of a quarter-wavelength, the conductors must be treated as transmission lines, and unused portions of the conductors become either unwanted reactances or sinks for signal energy. Unwanted connections between "independent" circuits is called crosstalk. Suppressing it requires attention to common impedances and shielding and the provision of adequate attenuation at each open crosspoint. The amount of attenuation required depends on several factors and, in general, is larger than is often expected. Standing waves and reflections at various points within a matrix switch become more critical at the higher frequencies. Other problem areas are change in phase and group delay which a signal may experience as it passes through a matrix switch and the amplifier associated with it.

It is thus advantageous to have an improved matrix switch that decreases crosstalk coupled onto output buses from signals passing through open crosspoint switches, decreases the change in signal voltage on an input bus when several outputs are paralleled to an input bus, and that reduces the voltage-standing-wave ratio on an input line because of any standing waves that may appear on the input bus to which it is connected.

SUMMARY OF THE INVENTION

In an embodiment of this invention, a matrix switch has a number of outputs that may be connected to one input. An attenuating "pad" at each input of each matrix switch, matches the incoming line impedance to the input bus of lower impedance. The input bus is terminated in its characteristic impedance. Conventional low-capacitance crosspoint switches are used to connect each input bus to one or more of the output buses. The output buses are of a higher impedance than the input buses, because of the matching of the "attenuating pad," whereas the output buses are normally terminated in the high-input impedance of a buffer amplifier that is used to offset the loss of the input attenuator. The amplifier is then made to match the impedance of the output line to which it is connected. This however, affords a low impedance characteristic of the input bus feeding into a high impedance output bus.

The input bus, having a low characteristic impedance relative to the output buses, does not have its voltage materially affected by the connecting of a multiple number of output buses to a single input bus. The low impedance of the input bus is not affected by changes in the output impedance of the input signal line, and any standing waves resulting from the closing of the switches, is absorbed by the terminal impedance matching at each end of the input bus. Further to stabilize the voltage level on the input bus despite the number of output buses it is driving, an inductor is placed in series with the input end of the bus. With the capacitance to ground of the circuit following it, the inductor forms a half-section, low-pass filter, that offsets the increase in capacitance load on the input bus resulting from the closing of matrix switches connecting the output buses to the input bus.

It is therefore an object of this invention to provide a new and improved matrix switch with improved transmission characteristics.

It is another object of this invention to provide a new and improved matrix switch using low impedance input buses that reduces crosstalk, lessens signal-voltage changes as the number of outputs paralleled on any one input line changes, and reduces the voltage-standing-wave ratio on the incoming line by decoupling the input bus from the input line, and by using a half-section, low-pass filter in the input line to improve the voltage stability of the input bus when the number of outputs paralleled onto the input bus changes.

Other objects and many advantages of this invention will become more apparent upon a reading of the following detailed description and an examination of the drawings, wherein like reference numerals designate like parts throughout and in which, FIG. 1 is a schematic diagram of an embodiment of the matrix switch circuit of this invention.

Figure 1:
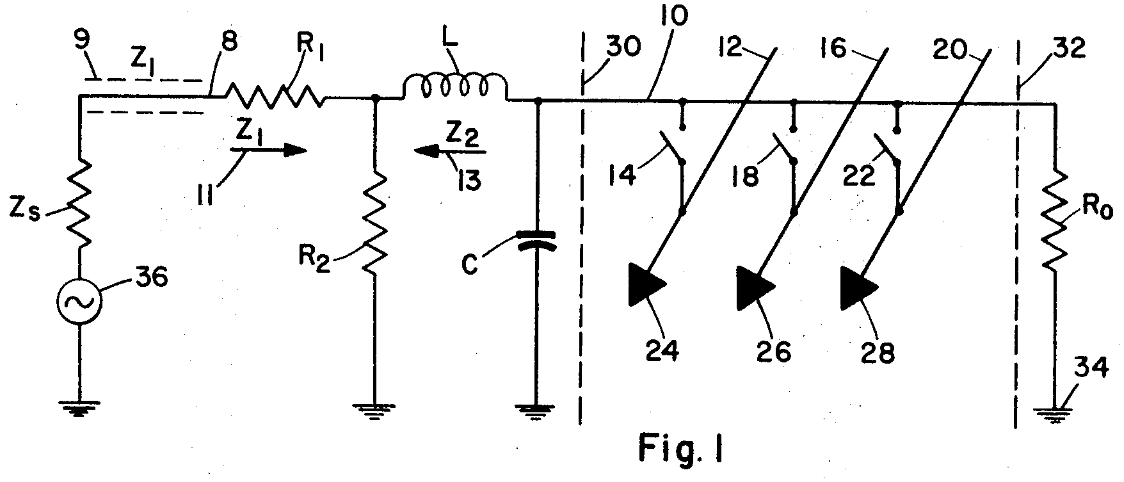

Referring to FIG. 1, the matrix switch illustrated comprises one input line 8 for feeding three of N crosspoints and three of N output lines. It may be understood that there may be any reasonable number of input lines 8 corresponding to the input system of this invention for feeding any number N of output lines forming a matrix switch. The switches 14, 18 and 22 may comprise any suitable known matrix type, switch and preferably are reed type switches of the magnetic type, that are easily operated by computer controlled switching techniques.

An input signal from a signal source 36 having an impedance $Z_s$ is supplied through an input transmission line 9, which may comprise a coaxial cable or other suitable transmission line having an impedance $Z_1$. The input transmission line 9 then feeds the input signal to an attenuator pad that in this embodiment comprises in part a resistance bridge or voltage divider. The signal passes through the voltage divider into an inductance L and capacitance to ground C, through input bus 10 and through an output impedance $R_0$ to ground 34. The input bus 10 generally extends between dotted lines 30 and 32.

The total impedance effect of the attentuating pad is composed of resistors $R_1$, $R_2$, and $R_0$. These resistors are chosen so that the impedance seen looking into the input arrow 11 is $Z_1$, thus matching the impedance of the input line 8. The impedance seen looking from the input bus back, illustrated by arrow 13, is $Z_2$. $Z_2$ is made equal to $R_0$ so that both ends of the input bus 10 are terminated in matching impedances and the outputs connected to the input bus 10 see the input bus 10 as two equal impedances of $R_0$ in parallel. The resistance $R_1$ is sufficiently low to set a low impedance characteristic to the input bus 10. The output buses 12, 16 and 20 feed into output buffer amplifiers 24, 26, and 28 that amplify the signal to offset the loss of the input attenuator. The output buffer amplifier gives the output buses a high input impedance. Thus the input bus 10, upon the closing of any one of the switches 14, 18 or 22 feeds a signal into a high impedance output bus. The addition of resistor $R_2$ to the voltage bridge formed by $R_1$, $R_2$ allows the output impedance of the input line 8 to be matched to the characteristic impedance of the input bus 10. Since $R_0$ is set to match the input termination impedance to the characteristic impedance of the input bus 10, then the impedances at each end of the input bus are equal and matching impedances. So any voltage-standing-waves that occur, such as, as a result of the opening or closing of switches 14, 18 and 22, are absorbed in the end impedances of the input bus 10. Further the voltage divider formed by resistance $R_1$ and $R_2$ tend to alleviate any need to match the impedances $Z_s$ or $Z_1$ with the low characteristic impedance of the input bus 10. This follows because the output impedance to the input bus is dependent upon the ratio of $R_2$ in parallel with $R_1$ plus $Z_1$ and $Z_s$. It is possible to choose values of $R_1$ and $R_2$ to reduce any effect of variance of the impedance of $Z_s$ and $Z_1$. Thus while it is advantageous to match the output impedance of the output signal line, it is not necessarily required. It is to be recognized that it is customary that impedance $Z_s$ will be matched to the line impedance.

In any matrix switch, the impact on the voltage on the input bus of switching numerous output buses to the input bus must be considered. The output bus is primarily of a capacity impedance relative to the input bus and can lower the voltage as well as cause phase changes in the input-output signal. Because of the low impedance of the input bus relative to the output buses, wherein for example, the characteristic impedance of the input bus may be 100 ohms and the input impedance of the output bus in the order of 8,000 ohms, the current through the low impedance load is so large compared to the current drawn by any one of the high impedance buses, that multiple connections have only a negligible effect on the voltage of the signal in the input bus 10.

Figure 2:
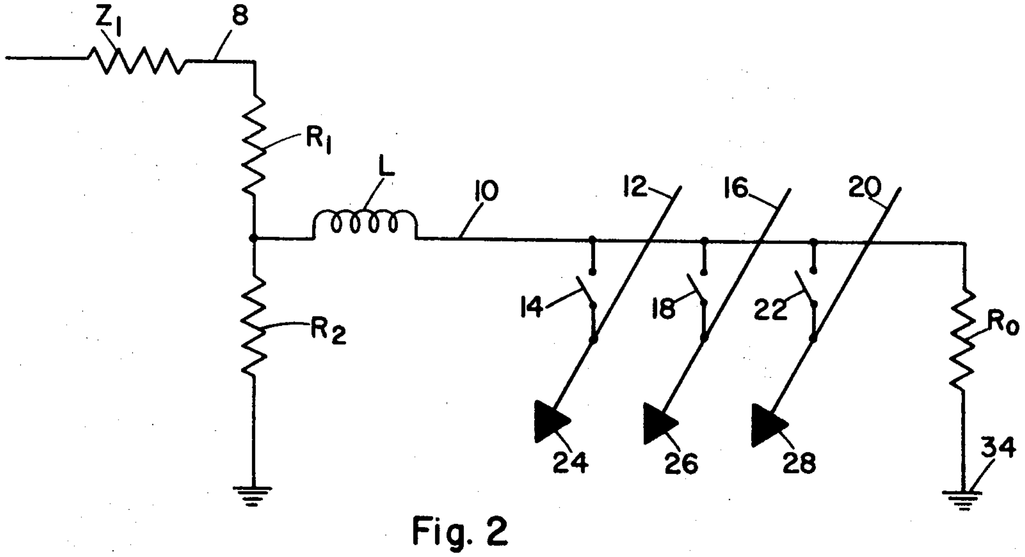
FIG. 2 is a schematic representative diagram of the circuit illustrated in FIG. 1.

The half-section low-pass filter L and C, is designed with a cutoff frequency well above the highest frequency that the matrix switch is required to handle. The purpose of the half-section filter is to extend the tolerance of the input bus 10 for capacity of loading, that results from the closing of the switches 14, 18 and 22. While this is not necessary in all matrix switch applications, it is usually required when a substantial amount of paralleling or bridging of outputs on one input line is required. It is generally expected that it is within this invention to design the half-section filter as a constant-K filter. FIG. 2 schematically illustrates the circuit of FIG. 1 in slightly modified form. The effective resistance of input transmission line 9 (as seen in FIG. 1) is illustrated as resistor $Z_1$ in FIGS. 2 and 3. If desired, capacitance C shown in FIG. 1 may be eliminated, so that the circuit is simplified as shown in FIG. 2. However, best results are obtained with the preferred arrangement illustrated in FIG. 1.

Figure 3:
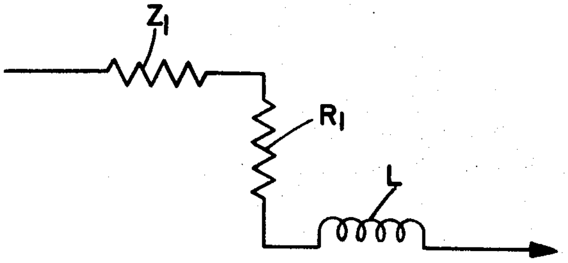
FIG. 3 is a partial modified schematic illustrating a modification to the circuits illustrated in FIGS. 1 and 2.

As previously described, the circuit of FIGS. 1 and 2 may operate without the resistor $R_2$, as shown in FIG. 3 wherein the operation of the matrix switch is more affected by mismatch of the output impedance of the input signal line and the input impedance of input line 8, and that standing-waves are required to be absorbed by the input bus termination rather than at each end of the input bus 10. While it is possible to thus further simplify the circuit, as shown in FIG. 3, best results are obtained with the preferred circuit arrangement shown in FIG. 1.

Having described our invention, we now claim.

1. A matrix switch circuit comprising,
   an input bus having a first impedance that is the characteristic impedance of said input bus,
   said input bus terminating with a second impedance means for terminating said input bus in its characteristic impedance,
   an input line for carrying an input signal to said input bus,
   a plurality of output buses, each having a second input impedance,
   switch means for electrically connecting said output buses to said input bus,
   circuit means comprising a first impedance means in said input line for making said first impedance substantially lower than said second input impedance, and
   said first impedance means comprising a voltage bridge circuit having an output impedance that matches said first impedance.
2. A matrix switch circuit as claimed in claim 1 in which there is inductor means in said input line for reducing the effect of capacitive loading on said first bus upon the closing of said switch means.
3. A matrix switch circuit as claimed in claim 1 in which,
   said voltage bridge circuit comprises a resistive bridge circuit with one side of the bridge connected to ground.
4. A matrix switch circuit as claimed in claim 1 in which,
   the input impedance to said first impedance means substantially matches the output impedance of an input signal generator electrically connected to said input line.